United States Patent [19]

Brown et al.

[11] Patent Number: 4,603,914
[45] Date of Patent: Aug. 5, 1986

[54] AXIALLY ADJUSTABLE VEHICLE WHEEL COVER

[75] Inventors: Trevor J. Brown, Rochester; Eugene S. Dipzinski, Sterling Heights, both of Mich.

[73] Assignee: General Motors Corporation, Detroit, Mich.

[21] Appl. No.: 708,006

[22] Filed: Mar. 4, 1985

[51] Int. Cl.⁴ .................. B60B 7/04; B60B 7/06
[52] U.S. Cl. .................. 301/37 P; 301/37 CD; 411/529
[58] Field of Search ................. 411/408–410, 411/520, 525–529; 301/37 P, 37 C, 37 CD, 37 R, 108 A

[56] References Cited

U.S. PATENT DOCUMENTS 2,894,302  7/1959  Fox ............................. 411/529 X
3,464,309  9/1969  Kilmarx ......................... 411/529
3,876,257  4/1975  Buerger ......................... 301/37 P

FOREIGN PATENT DOCUMENTS 215583  12/1957  Australia ....................... 301/37 CD
656432   8/1951  United Kingdom ............. 301/37 CD Primary Examiner—David A. Scherbel
Attorney, Agent, or Firm—Herbert Furman

[57] ABSTRACT

A vehicle wheel cover includes a plastic cover body and an annular retention band which is secured to the cover body by a series of projections on a flange of the body being received through openings in the band. The material of the openings is formed into integral lanced tabs which engage shoulders of the projections. The axial extent of the openings is greater than that of the projections to permit axial adjustment of the cover body and retention band relative to each other. The band is provided with retaining fingers for retaining engagement of the cover on a vehicle wheel.

5 Claims, 5 Drawing Figures

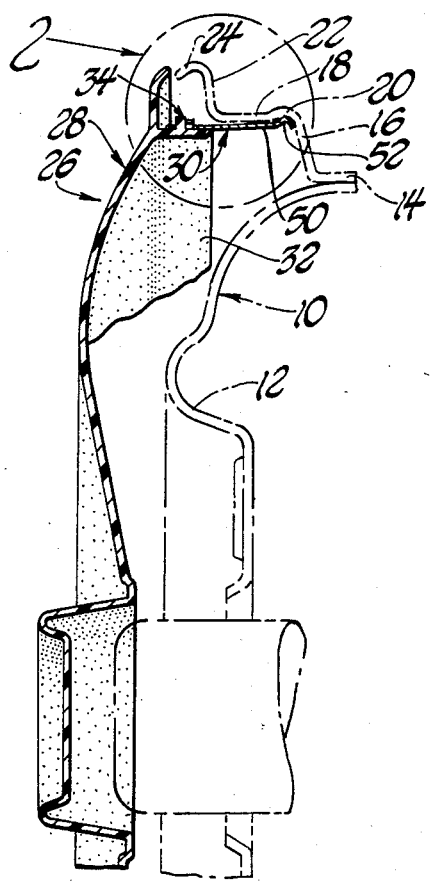
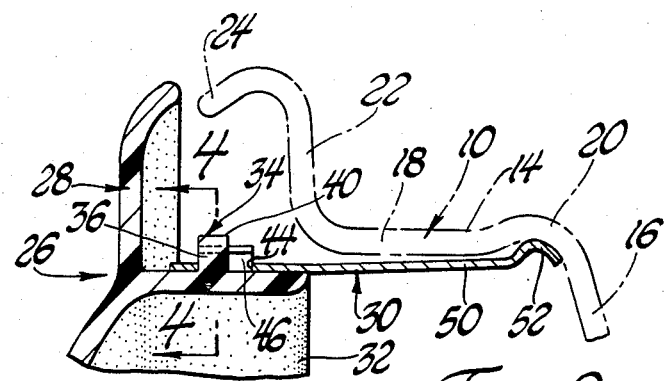
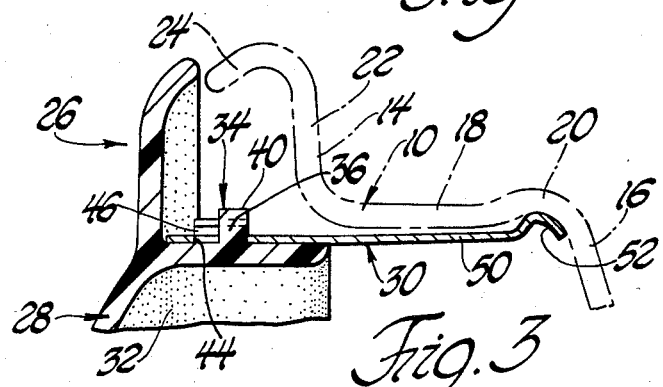
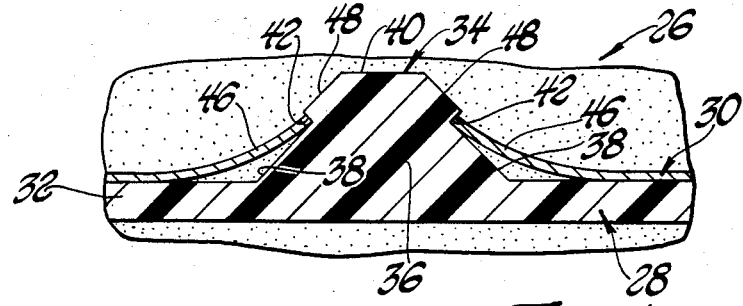
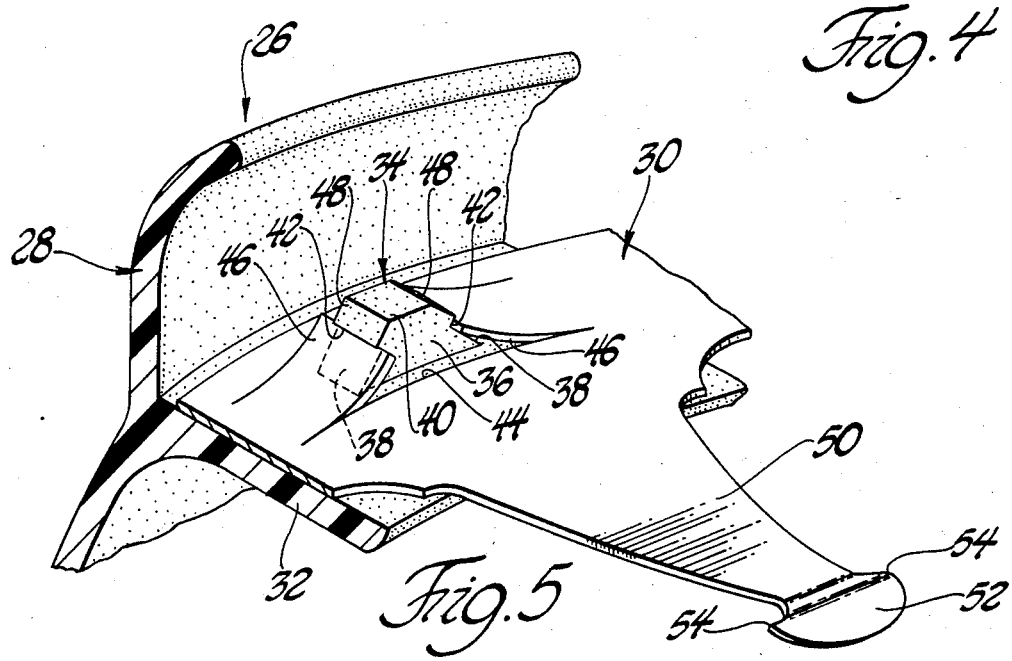

AXIALLY ADJUSTABLE VEHICLE WHEEL COVER

This invention relates generally to vehicle wheel covers and more particularly to vehicle wheel covers of the type including a plastic cover body and a metal retention ring which is secured to the cover body and is releasably engageable with an annular retention flange of a vehicle wheel to mount the cover to the wheel.

While the vehicle wheel cover of this invention is of this general type, it includes features which provide improved assembly of the cover body and the retention ring and also provide for adjustment of the cover body relative to the lip or terminal flange of the wheel after the cover has been mounted on the wheel.

The cover body is provided with an annular retention flange having a plurality of annularly spaced integral shoulders or projections. Each projection extends both axially and radially of the flange and includes an undercut head portion having shoulders which face radially inwardly toward the flange. A metal retention band is provided with a series of openings, each respective to one of the projections and receiving a respective projection therethrough. The material of the opening provides integral lanced tabs. When the band is forced over the projections, the edges of the tabs engage the shoulders of the head portions of the projections and the tabs are bent radially outwardly of the band so that they engage the projections with a predetermined frictional force and assemble the band to the cover body. The axial extent of the openings is greater than the axial extent of the projections.

The band is provided with a series of retaining fingers which are releasably engageable with the annular retention flange of the wheel to mount the cover thereon. After the cover has been mounted to the wheel, a predetermined force applied to the cover body in an axially inward direction moves the cover body inwardly relative to the retention band to adjust the spacing between the outer peripheral edge of the cover body and the outer or lip flange of the wheel. The force applied to the cover body must be greater than the frictional force between the lanced tabs and the undercut head portions of the projections.

The primary feature of this invention is that it provides an improved vehicle wheel cover wherein a retaining band is assembled to a plastic cover body by projections on the cover body being frictionally engaged by integral lanced tabs on the band. Another feature is that the tabs are formed from the material of openings in the band which receive the projections therethrough. A further feature is that the fingers engage undercut head portions of the projections. Yet another feature is that the axial extent of the openings is greater than that of the projections to permit axial adjustment of the band relative to the cover body upon application of a predetermined relative force therebetween. Yet a further feature is that the retention band is releasably engageable with a retention flange of the vehicle wheel to mount the cover thereon, with the cover body being adjustable inwardly relative to the wheel upon the application of a predetermined axial inward force on the cover body sufficient to overcome the frictional force between the tabs of the band and the projections of the cover body.

These and other features will be readily apparent from the following specification and drawings wherein:

FIG. 1 is a partial sectional view of a vehicle wheel cover according to this invention mounted on a conventional vehicle wheel.

FIG. 2 is an enlarged view of the portion of FIG. 1 indicated by a dash dot circle.

FIG. 3 is a view similar to FIG. 2 and showing an adjusted position of the cover body relative to the wheel.

FIG. 4 is an enlarged view taken generally along line 4—4 of FIG. 2, and

FIG. 5 is a partial perspective view.

Referring now particularly to FIG. 1 of the drawings, a vehicle wheel 10 indicated by dot dash lines is of conventional structure and includes a wheel body or spider 12 and a wheel rim 14 which is conventionally secured to the spider at the drop center flange of the rim. The rim includes a radially extending annular flange 16 and an annular retention flange 18 which is joined to the flange 16 across a tire bead seat 20. Flange 18 merges into an annular radial flange 22 which in turn merges into an outer lip or terminal flange 24.

A wheel cover assembly 26, according to this invention, includes a cover body 28 of plastic material and a metal retention ring or band 30. The cover body 28 covers the entire opening of the wheel 10 as defined by the flange 24.

As best shown in FIGS. 1, 4 and 5, the cover body 28 includes a continuous annular flange 32 which is formed integral with the cover body. At a series of circumferentially spaced locations, the flange 32 is provided with axially and radially extending projections 34, each of which includes a body portion 36 having sloped side walls 38, FIG. 4 and a head portion 40 of undercut configuration and including shoulders 42 each of which extends generally normal to a respective wall 38.

The band 30 is discontinuous but generally surrounds the flange 32 except for a minor gap. The band includes a circumferential series of openings 44, FIG. 5, each of which receives a respective projection 34 therethrough. The material of each opening 44 is formed into a pair of integral lanced fingers or tabs 46. The end or free edge of each tab engages a shoulder 42 with a predetermined frictional force which is determined by the extent of the tab and the radial spacing of shoulder 42 relative to flange 32. Each tab also engages a wall 38 adjacent a shoulder 42. The engagement of the tabs 46 with the shoulders 42 and walls 38 releasably secures the band 30 to the cover body 28 to provide the wheel cover assembly 26. As shown in FIGS. 2 through 5, the axial extent of the projections 34 is less than that of the tabs 46. The band 30 is formed of strip material and is secured to the cover body 28 by forcing the projections 34 radially outwardly through respective openings 44. The tabs 46 are normally coplanar with the band 30 and are bent radially outwardly during assembly. The sloped side walls 48 of the head portions 40 aid in bending the tabs during initial assembly of a projection 34 with the band 30. The band 30 tightly engages the radially outer surface of flange 32 after assembly. The band is discontinuous and the gap in the band is preferably located between a pair of projections 34.

At a series of circumferentially spaced locations, the band 30 includes integral retaining fingers 50 of tapered configuration. Each finger 50 terminates in a circumferentially linear end portion 52 of arcuate cross-section which is releasably engaged with the tire bead seat 20 of the wheel as shown in FIGS. 2 and 3. The circumferential sides 54 of the linear end portions 52 dig into the bead seat 20 to prevent relative rotation between the cover assembly 26 and the wheel 10.

The projections 34 are located at the axially outer sides of the openings 44 when the band 30 is assembled to the cover body 28, as shown in FIG. 2. Once the cover assembly 26 has been mounted on the wheel, the cover body 28 can thereafter be adjusted axially inwardly of the flange 24, as shown in FIG. 3, by applying an axially inward force to the cover body 28 sufficient to overcome the frictional retaining force between the ends of the tabs 46 and the shoulders 42 of the projections 34. Thus, the cover body can be moved from its FIG. 2 position to its FIG. 3 position or to any position in between, if desired. During this movement of the cover body, the band 30 remains stationary relative to the wheel.

Once the cover body has been adjusted relative to the band 30, it can be readjusted to its initial starting position, as shown in FIG. 2 or to any other position between the positions of FIGS. 3 and 2, if desired, by removing the cover assembly 26 from the wheel and applying the sufficient force between the cover body 28 and the band 30 to move them axially apart.

Normally, the fingers 46 engage the projections 34 with sufficient frictional force so that no mechanical interlock is necessary or required. However, if such a mechanical interlock is desired, the shoulders 42 and the ends of tabs 46 can be ribbed. If a one way mechanical interlock is desired, one of the sets of ribs can be angled axially inwardly.

Thus this invention provides an improved vehicle wheel cover assembly.

The embodiments of the invention in which an exclusive property or privilege is claimed are defined as follows:

1. The combination comprising, a vehicle wheel having an annular retention flange, a wheel cover of plastic material having an annular retention flange provided with a plurality of annularly spaced axially and radially extending projections, an annular retention band provided with a plurality of axially extending openings, each respective to and receiving a projection of the cover flange therethrough, cooperating means on the band and on the projections frictionally interengageable to lock the band to the retention flange of the cover, retaining means on the band releasably engageable with the retention flange of the wheel to releasably retain the cover to the wheel, the openings of the band having a greater axial extent than the axial extent of the respective projections and permitting movement of the cover relative to the band, the cover being adjustable relative to the wheel after engagement of the retaining means of the band with the retention flange of the wheel upon the application of a force to the cover sufficient to overcome the frictional force of the cooperating means on the band and on the projections.

2. The combination comprising, a vehicle wheel having an annular retention flange, a wheel cover of plastic material having an annular retention flange provided with a plurality of annularly spaced radial projections having a predetermined axial extent, an annular retention ban provided with a plurality of openings, each having an axial extent greater than the axial extent of a respective projection received therethrough, cooperating interengaging releasable means on walls of the opening and juxtaposed walls of the projections locking the band to the retention flange of the cover, retaining means on the band releasably engageable with the retention flange of the wheel to releasably retain the cover to the wheel, the greater axial extent of the openings of the band relative to the respective projections permitting axial movement of the cover relative to the wheel after engagement of the retaining means of the band with the retention flange of the wheel upon release of the cooperating releasable means on the band and on the projections.

3. The combination comprising, a vehicle wheel having an annular retention flange, a wheel cover of plastic material having an annular retention flange provided with a plurality of annularlly spaced axially extending projections, an annular retention band provided with a plurality of annularlly spaced openings, each having an axial extent greater than that of a respective projection of the cover flange received therethrough, finger means on the band frictionally interengageable with the projections to releasably lock the band to the retention flange of the cover, the cover being adjustable relative to the wheel after engagement of the retaining means of the band with the retention flange of the wheel upon the application of a force to the cover sufficient to overcome the frictional engaging force of the fingers with the projections.

4. The combination comprising, a vehicle wheel having an annular retention flange, a wheel cover of plastic material having an annular retention flange provided with a plurality of annularly spaced radial projections having side walls and end walls spaced apart a predetermined axial extent, an annular retention band provided with a plurality of openings, each having end walls spaced apart an axial extent greater than the axial extent of a respective projection received therethrough, integral finger means on the retention flange of the cover releasably engaging the side walls of the projections with a predetermined force to lock the band to the retention flange of the cover, and retaining means on the band releasably engageable with the retention flange of the wheel to releasably retain the cover to the wheel, the greater axial extent of the end walls of the openings of the band relative to the end walls of respective projections permitting axial movement of the cover relative to the wheel after engagement of the retaining means of the band with the retention flange of the wheel upon overcoming the engaging force of the fingers of the band on the projections of the wheel cover.

5. The combination comprising, a vehicle wheel having an annular retention flange, a wheel cover of plastic material having an annular retention flange provided with a plurality of annularly spaced projections having axially spaced end walls and circumferentially spaced side walls, an annular retention band provided with a plurality of annularly spaced openings, each having axially spaced end walls spaced apart an axial extent greater than that of a respective projection of the cover flange received therethrough, integral finger means lanced from the band and having free end portions circumferentially spaced apart less than the side walls of the projections and frictionally interengageable therewith to releasably lock the band to the retention flange of the cover, the cover being adjustable relative to the wheel after engagement of the retaining means of the band with the retention flange of the wheel upon the application of a force to the cover sufficient to overcome the frictional engaging force of the end portions of the fingers with the projections.

* * * * *